March 3, 1970      R. R. WILSON      3,498,621
VALVE STEM SEAL

Original Filed June 14, 1965      3 Sheets-Sheet 1

INVENTOR.
ROBERT R. WILSON
ATTORNEYS

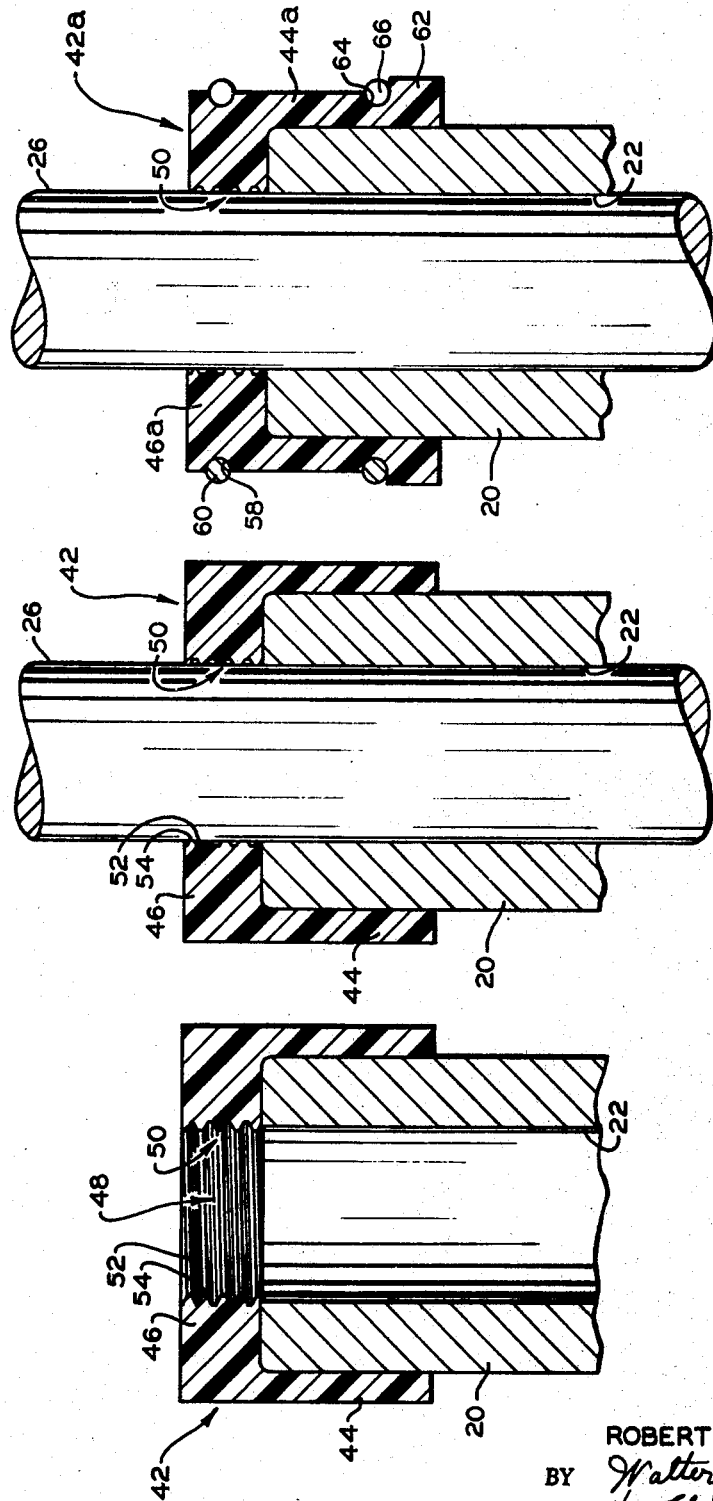

March 3, 1970    R. R. WILSON    3,498,621
VALVE STEM SEAL

Original Filed June 14, 1965    3 Sheets-Sheet 3

INVENTOR.
ROBERT R. WILSON
BY
ATTORNEYS

United States Patent Office 3,498,621
Patented Mar. 3, 1970

3,498,621
VALVE STEM SEAL
Robert R. Wilson, Hagerstown, Ind., assignor to Dana Corporation, Toledo, Ohio, a corporation of Virginia
Continuation of application Ser. No. 463,503, June 14, 1965. This application Apr. 25, 1968, Ser. No. 724,296
Int. Cl. F16j 15/24, 15/56
U.S. Cl. 277—152                2 Claims

ABSTRACT OF THE DISCLOSURE

A valve stem seal is disclosed wherein an elastomeric ring having an inner, cylindrical sealing surface sealingly engages the stem of a valve mounted for reciprocating movement in a valve guide. A helical groove formed in the cylindrical sealing surface defines, together with the valve stem, a continuous, closed channel for metering oil to the valve stem and valve guide bearing surfaces. A metallic spring ring urges the sealing surface into contact with the valve stem. Various means are disclosed for maintaining the elastomeric ring in sealing engagement with the valve guide, including an integral depending skirt and spring-ring, a valve-spring biased cap and a snap-on cap.

---

This application is a continuation of application Ser. No. 463,503, filed June 14, 19653 and now abandoned.

This invention relates to means for sealing relative reciprocating members and more particularly relates to means for metering the flow of oil between the stem of a valve and a valve guide of an internal combustion engine.

Internal combustion engines have a plurality of intake and exhaust valves, each comprising a valve head and a stem reciprocally mounted in a valve guide. The valve guide may be an integral part of the cylinder head or block, or may comprise a separate member fitted in the cylinder head or block. The end of the valve stem opposite the head is engaged by a rocker arm in an overhead valve engine or a plunger in an L-head engine and is cam operated thereby. In the case of the overhead valve engine, oil is usually supplied through the rocker arm to the point of contact with the end of the valve stem, and the oil runs along the stem to lubricate the latter as it reciprocates within the guide. As wear occurs in the valve guide or on the valve stem, the oil tends to work through the guide to the head of the valve where it may be drawn either into the combustion chamber, in the case of an intake valve, or through the exhaust port, in the case of an exhaust valve, leading, in either case, to excess consumption of oil and formation of carbon deposits. Similar conditions can occur in an L-head engine.

In order to reduce oil consumption, prevent carbon build-up and hold engine performance to an optimum level while cutting fuel consumption, valve seals have been mounted on valve guides and about valve stems to meter the amount of oil flowing between the stem and the guide. Various materials have been used for valve seals including polytetrafluoroethylene, nylon and various elastomeric materials, and while some have proven long wearing and efficient materials, the initial cost of valve seals made of a satisfactory material is relatively high and they do not accurately meter the flow of lubricant therepast.

It is, therefore, an object of this invention to provide a durable, low cost valve seal.

It is another object of this invention to provide a valve seal to meter the amount of oil supplied between a valve stem and a valve guide.

It is still another object of this invention to provide a valve seal of novel configuration.

It is a further object of this invention to provide a novel valve seal made of elastomeric material adapted to accommodate relative reciprocating movement between the seal and a valve stem.

Other objects and advantages will become apparent from the following description taken in connection with the accompanying drawings, in which:

FIG. 2 is a cross-sectional view of a valve seal embodying the principles of this invention mounted on a valve guide.

FIG. 3 is a view similar to FIG. 2 but with a valve stem disposed within the seal.

FIG. 4 is a cross-sectional view of a modified form of the valve seal shown in FIGS. 1–3.

Figure 1:
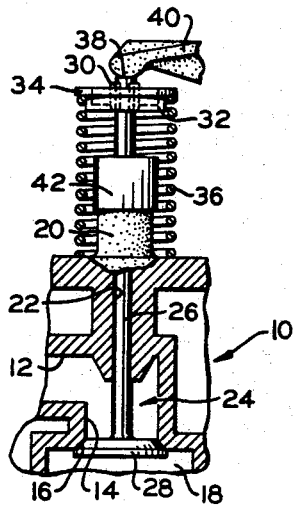
FIG. 1 is a fragmentary side elevational view, partially in section, of an overhead valve assembly provided with a seal embodying the features of this invention.

In one embodiment of this invention a valve seal is mounted upon a valve guide and has an opening for receiving a valve stem for relative axial reciprocating motion therein. The portion of the valve seal receiving the stem is made of an elastomer and the seal has means for biasing the sealing portion into a hugging relationship with the stem. Another portion of the valve seal sealingly engages the guide for mounting the seal thereon and the seal is provided with means for biasing the engaging portion into a pressing relationship with the guide. The opening in the seal receiving the stem has a slightly smaller original diameter than the diameter of the stem, thereby providing a force fit, and the wall forming an opening in the seal has a helical groove extending continuously about the circumference of the wall from the axial top to the axial bottom of the wall. The grooved wall comprises a plurality of helical lands having spacings therebetween. The lands form a sealing relationship with the stem while the spacings provide a passage for oil flow. Thus, the presence of the helical groove allows a metered amount of oil to flow in a circuitous path between the seal and the stem thereby providing oil about the entire periphery of the stem, but restricts direct axial flow to prevent excess oil from being drawn into the combustion chamber since there is no direct path for the oil to be drawn past the seal by the vacuum of the engine. The grooved wall may be coated with a friction reducing material to promote relative reciprocating movement between the seal and the stem.

Referring now to the drawings wherein like numerals are used throughout to designate like parts:

A cylinder head of an internal combustion engine is shown partially at 10 having a passage 12, which passage may either be part of the fuel intake system or part of the exhaust system. The passage 12 communicates through an opening 14, bounded by a valve seat 16, with a combustion chamber 18. Secured to the cylinder head 10 is a valve guide 20 which may either be integral with the cylinder head as shown or a separate member rigidly secured thereto. Extending through the valve guide 20 and cylinder head 10 is an opening 22 which communicates with the passage 12. Disposed within the opening 22, the passage 12 and the combustion chamber 18 for axial reciprocal movement is a valve 24 comprising a valve stem 26 received within the opening 22 and a valve head 28 positioned below the opening 14 and adapted to sealingly engage the valve seat 16 to open and close the communication between the passage 12 and the combustion chamber 18 as the valve reciprocates.

The valve stem 26 projects upwardly through the opening 22 beyond the top of the guide 20 and is usually provided, in the proximity of its upper end, with a keeper 30 for receiving a collar 32 having a circumferential annular flange 34. Disposed between the collar 32, in abutting relationship with the flange 34, and the cylinder head 10 is a coil spring 36, which coil spring biases the valve 24 axially upwardly until the head 28 of the valve engages the valve seat 16 to close the communication between the passage 12 and the combustion chamber 18.

The top 38 of the valve stem 26 is engaged by a rocker arm, partially shown at 40, which arm is operated by a cam shaft (not shown) of the engine. When actuated, the rocker arm 40 bears against the valve top 38 to move the valve 24 axially downwardly and overcomes the coil spring 36, thereby displacing the valve head 28 from engagement with the valve seat 16 and into the combustion chamber 18 to effect communication between the passage 12 and the combustion chamber 18. Because of the rubbing contact of the rocker arm 40 and the valve top 38, oil must be supplied to such point of contact to prevent excess wear. This oil is supplied conventionally from an opening (not shown) in the rocker arm 40 and runs down the stem 26 to further lubricate the valve 24 as it reciprocates within the opening 22.

Fastened about the uppermost portion of the valve guide 20 is a valve seal 42 which prevents excess oil from running down the valve stem 26 toward the head 28 where it would be carried away with the intake or exhaust gases. The valve seal 42 in this embodiment is an inverted, cup shaped structure having a side wall or engaging portion 44 and a transverse sealing portion 46; the latter having an axially extending opening 48 therein adapted to receive the axially reciprocating stem 26. The transverse portion 46 of the seal 42 is composed of an elastomeric material so that a hugging relationship may be provided between the same and the valve stem 26. The side wall 44 of the valve seal 42 is mounted upon the guide 20 to form a seal therebetween and may also be made of elastomeric material, but since there is no relative movement between the side wall and the valve guide 20 the side wall may be made of another material, such as spring steel, which allows a secure, sealing engagement between the side wall and and the valve guide.

An internal wall 50 in the transverse portion 46 surrounds and defines the opening 48 and has a thread or helical groove 52 formed therein; the groove being continuous from one axial end of the transverse wall to the opposite axial end and circumscribes a path around the transverse wall of at least 360° so that oil may be provided to the entire circumference of the stem 26. The helical groove 52 of this particular embodiment has a plurality of revolutions to provide a helical land 54.

The valve stem 26 has an outside diameter slightly greater than the original diameter of the opening 48 for the purpose of creating a biasing force upon the stem by the elastomeric transverse sealing portion 46 and to compensate for any lack of coaxiality between the stem 26 and the opening 48. This difference in diameter assures a snug fit between the stem 26 and the wall 50 after the stem is disposed within the opening 48 because of the intrinsic nature of the elastomeric material to assume its original shape. More particularly, the original diameter at the land 54 should be less than the diameter of the stem 26 and the opening 22 as clearly shown in FIG. 2, while the diameter at the base of the groove 52 should be greater than that of the stem. With this arrangement, the land 54 will be compressed, as shown in FIG. 3, against the stem 26, but the groove 52 will remain open, thus providing a snug fit while still retaining a limited passage through the seal 42.

It has been found that the thread 52 must have a lead extending substantially from the axial top to the axial bottom of the transverse portion 46 that is, annular grooves do not work properly as they do not provide for a continuous path. The presence of the helical groove 52 in the wall 50 causes the oil to follow a circuitous path through the seal 42 so as to be metered through the opening 48 in such amounts that the oil is not wasted. Although any general helical groove 52 will tend to promote relative reciprocating movement of the stem 20 while metering the flow of oil therethrough, if the groove 52 is too large, too much oil will be allowed to flow therethrough, whereas if the threads are too fine, insufficient oil will be able to flow through the seal to lubricate the stem where it reciprocates within the valve guide 20. Consequently, the oil supplied between the valve stem 26 and the guide 20 may be selectively metered by proper selection of the helical groove 52.

Particularly good results have been obtained using an opening 48 having a helical groove 52 in the form of an Acme thread design of 100 threads to the inch and a thread depth of approximately 0.005" formed on the wall 50 of a seal 42 mounted about a valve stem 26 having a diameter of $11/32''$.

As stated previously, the helical groove 52 in the seal 42 requires the oil to follow in a circuitous path, downwardly along the valve stem 26. By so introducing a circuitous path, the helical groove tends to prevent "pumping." Pumping may occur in a valve seal having annular grooves, for a series of individual pockets is created therein which oil may accumulate and, when there is no lead in the grooves allowing the oil to escape, these pockets would set-up a resistance and cause the valve seal to reciprocate in a jerking fashion rather than slide freely relative to the stem 26. This increased resistance, with the accompanying irregular movement of the seal 42, would cause the seal to separate from the stem, thereby exposing a large axial opening along the length of the seal through which oil would be sucked into the combustion chamber.

The valve seals 42 of this invention have at least the sealing portion 46 made of elastomeric material, and particularly good results have been obtained from seals made of acrylonitrile, butadiene and polyacrylics rubbers and combinations thereof. These are well known materials which are widely used in internal combustion engines for sealing purposes. In some instances the sliding, sealing surfaces, such as the internal wall 50, may be coated with a lubricating material, such as molybdenum disulfide, graphite, or the like, to provide a more slippery surface on the elastomeric material and decrease friction between the seal 42 and the valve stem 26. The methods of applying such surface coatings are well known and widely used for elastomeric seals.

Figure 5:
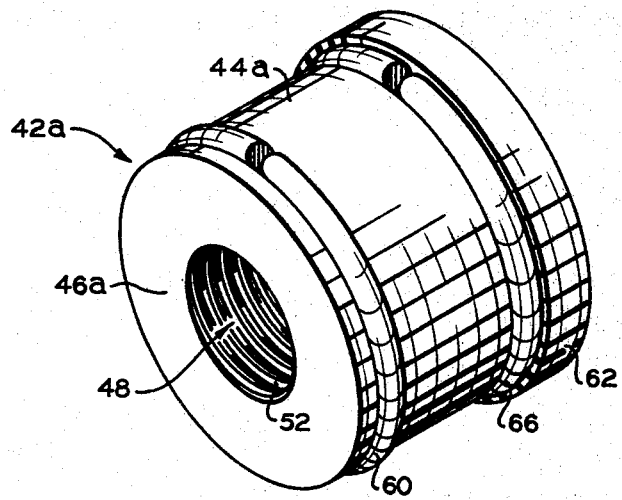
FIG. 5 is an isometric view of the valve seal in FIG. 4.

The valve seal 42 described hereinbefore depends upon its own resiliency to form the seal between itself and the stem 26 and valve guide 20. On many seals it would be desirable to implement the force urging the seal 42 radially inwardly against the stem 26 and/or the valve guide 20, particularly in engines which develop a high vacuum. A valve seal 42a which has been modified to provide radially biasing means is shown in FIGS. 4 and 5. In this modification, a peripheral groove 58 is formed about a transverse wall 46a near the top of the seal 42a and receives a retainer spring 60. The retainer spring 60 is an annular, spring steel member which uniformly presses the sealing portion 46 radially inwardly to promote a hugging relationship between the land 52 and the valve stem 26. A side wall 44a depends from the portion 46a and has at its end remote from the sealing portion 46a a peripheral end circumferentially extending rib 62 and another peripheral groove 64 formed in the side wall 44a adjacent to the rib 62. The groove 64 receives a second annular retainer spring 66 to pressingly secure the side wall 44a to the top of the valve guide 20. Consequently, the valve seal of this particular embodiment comprises a sealing portion 46a having a stem receiving opening 48 therein, a side wall 44a integral with the sealing portion 46a and spring means including the inherent resiliency of the seal 42a for urging the transverse portion and the side wall in a pressing, sealing relationship with the valve stem 26 and valve guide 20 respectively.

Figure 6:
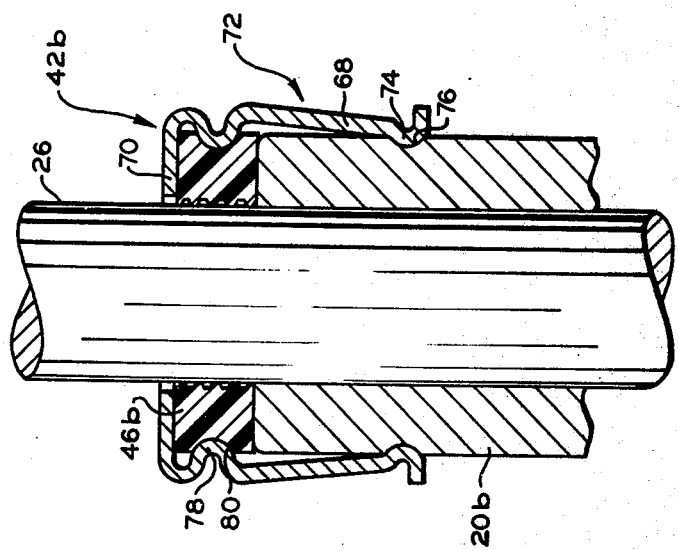
FIG. 6 is a cross-sectional view of another form of a valve seal embodying the principles of this invention.

In the embodiment shown in FIG. 6, the side wall or engaging portion is in the form of a resilient sleeve 68 made of springy metal and having a base portion 70 with a cylindrical portion 72 depending therefrom. The cylindrical portion tapers from the outer circumference of the base 70 radially inwardly and curves radially outwardly at its lower end to form a curvilinear surface 74. The valve guide 20b has a peripheral groove 76 which receives the curvilinear surface therein. The taper of the cylindrical portion 72 is such that the surface 74 is received within the groove 76 in a pressing relationship. The cylindrical portion 72 also has a radially, inwardly projecting flange 78 aligned with the axial center of the sealing portion 46b. The flange 78 is received within a groove 80 of the sealing portion 46b and extends radially inwardly sufficiently to bias the sealing portion 46b into a hugging relationship with the valve stem 26. The base 70 abuts the top of the sealing portion 46b to sealingly hold the same against the top of the valve guide 20b to prevent axial movement of the sealing portion and facilitate relative reciprocating motion between the sealing portion and the valve stem 26.

Figure 7:
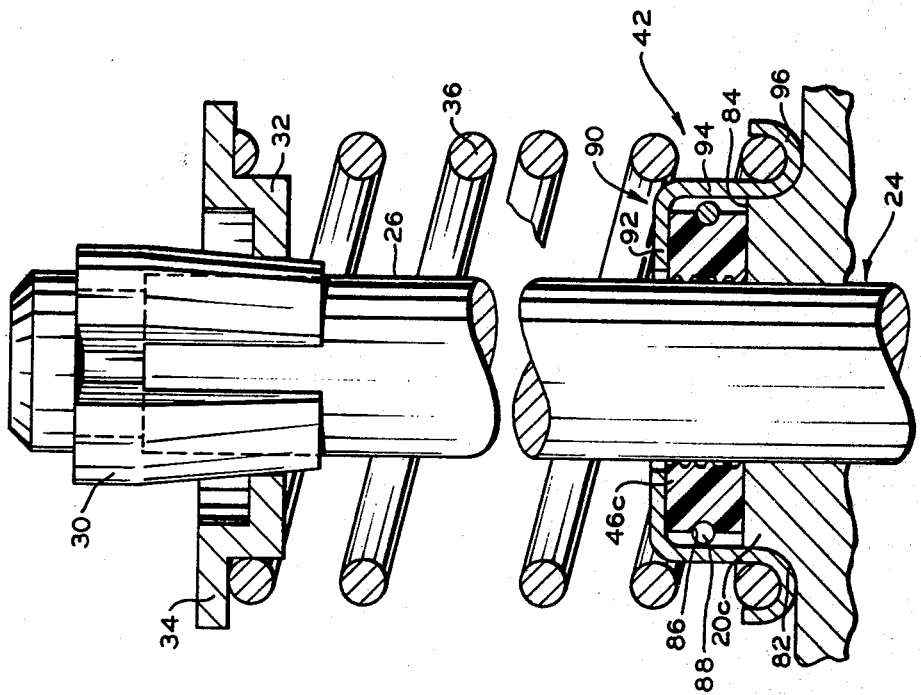
FIG. 7 is a cross-sectional view of still another form of a valve seal embodying the principles of this invention.

FIG. 7 shows an embodiment whereby the valve seal 42c not only meters the quantity of oil flowing between the stem 26 and the guide 20, but also supports the valve biasing the coil spring 36. In this embodiment, the valve guide 20c has an annular arcuate surface 82 coaxial with the stem 26, and a transverse seal engaging surface 84. The sealing portion 46c abuttingly engages the surface 84 and has an annular peripheral groove 86 receiving a retaining spring 88. The retaining spring 88 biases the sealing portion 46c radially inwardly into a sealing, sliding relationship with the stem 26. An annular cup shaped member 90 having a transverse base 92 and an axially extending cylindrical side wall 94 with an inverted lip 96 at the bottom thereof is disposed about the stem 26 with the base 92 in abutting relationship with the top of the sealing portion 46c. The outer surface of the inverted lip 96 abuts the arcuate surface 82 of the guide 20c and a coil spring 36 is received within the inverted lip, disposed intermediate the same and the collar 32 to bias the valve 24 axially upwardly and to bias the annular member 90 downwardly into a pressing relationship with the top of the sealing portion 46c and the inverted lip 96 against the arcuate surface 82.

From the foregoing, it is apparent that valve seals of novel configuration have been described that perform the function of controlling the amount of oil supplied to a valve stem and are of relatively simple construction and long endurance. While only a few embodiments of this invention have been shown and described, it is readily apparent that many changes can be made therein without departing from the scope of this invention as defined by the following claims.

The invention is claimed as follows:

1. In an internal combustion engine having a valve guide and a poppet valve stem mounted for reciprocating axial movement in said valve guide, a valve stem seal for sealing between said valve stem and said valve guide, comprising a transversely extending portion of elastomeric material positioned atop said valve guide, said elastomeric portion having an axially extending receiving opening axially aligned with said valve guide and defined by an internal cylindrical wall, said internal wall having a diameter less than the diameter of said stem and having a screw thread formed therein, said screw thread being continuous and extending the full axial length of said internal wall, a depending annular elastomeric skirt integral with said elastomeric portion at the periphery thereof, said skirt being adapted to snugly surround said valve guide, means for radially inwardly biasing said transversely extending portion and means for radially inwardly biasing said annular skirt.

2. A valve stem seal for use in an internal combustion engine having a poppet valve stem mounted for reciprocating axial movement in a valve guide, said valve stem seal comprising a transversely extending portion of elastomeric material positioned atop said valve guide and having an axially extending receiving opening defined by an internal wall, said internal wall having a continuous screw thread of approximately 100 threads per inch formed therein, said screw thread extending the full axial length of said internal wall and being open at both ends, said internal wall being sized so as to compressively engage said valve stem thereby partially closing said screw thread on insertion of said valve stem, a depending annular skirt integral with the periphery of said transversely extending portion and adapted to snugly surround said valve guide in securing relationship, means for radially inwardly biasing said elastomeric portion, and means for radially inwardly biasing said annular skirt.

References Cited

UNITED STATES PATENTS

| 3,278,190 | 10/1966 | Wood et al. | 277—70 X |
|---|---|---|---|
| 1,481,562 | 1/1924 | Rowe. | |
| 2,157,867 | 5/1939 | Robertson et al. | |
| 2,906,255 | 9/1959 | Bunce. | |
| 3,087,735 | 4/1963 | Aunspach et al. | 277—124 X |
| 3,171,659 | 3/1965 | Anderson et al. | |
| 3,198,188 | 8/1965 | Heid. | |

FOREIGN PATENTS

| 1,221,116 | 1/1960 | France. |
|---|---|---|
| 711,108 | 6/1954 | Great Britain. |
| 728,823 | 4/1955 | Great Britain. |

SAMUEL ROTHBERG, Primary Examiner

U.S. Cl. X.R.

123—188; 277—333, 162